(12) United States Patent
Lamp

(10) Patent No.: US 8,197,180 B1
(45) Date of Patent: Jun. 12, 2012

(54) WATER FLOW ENERGY EXTRACTION DEVICE

(76) Inventor: Dickie L. Lamp, Ponchatoula, LA (US)

( * ) Notice: Subject to any disclaimer, the term of this patent is extended or adjusted under 35 U.S.C. 154(b) by 0 days.

(21) Appl. No.: 13/102,518

(22) Filed: May 6, 2011

Related U.S. Application Data

(63) Continuation-in-part of application No. 13/051,551, filed on Mar. 18, 2011, now abandoned.

(60) Provisional application No. 61/316,201, filed on Mar. 22, 2010.

(51) Int. Cl.
*F01D 25/28* (2006.01)
(52) U.S. Cl. ............ 415/7; 415/906; 416/86; 416/196 A
(58) Field of Classification Search ............... 415/7, 3.1, 415/906, 908; 416/84, 85, 86, 194, 196 A, 416/DIG. 6; 290/42, 43, 53, 54
See application file for complete search history.

(56) References Cited

U.S. PATENT DOCUMENTS

| | | |
|---|---|---|
| 3,986,787 A | 10/1976 | Mouton, Jr. et al. |
| 4,239,976 A | 12/1980 | Collard |
| 4,516,033 A | 5/1985 | Olson |
| 4,781,023 A | 11/1988 | Gordon |
| 4,850,190 A | 7/1989 | Pitts |
| 4,864,152 A | 9/1989 | Pedersen |
| 4,868,408 A | 9/1989 | Hesh |
| 5,132,550 A | 7/1992 | McCabe |
| 6,365,984 B1 | 4/2002 | Shu |
| 6,551,053 B1 | 4/2003 | Schuetz |
| 6,806,586 B2 * | 10/2004 | Wobben .................. 290/54 |
| 7,105,942 B2 | 9/2006 | Henriksen |
| 2005/0017513 A1 | 1/2005 | Sipp |
| 2007/0007772 A1 | 1/2007 | Brashears |
| 2007/0108768 A1 | 5/2007 | Dempster |
| 2008/0012345 A1 | 1/2008 | Parker |

\* cited by examiner

*Primary Examiner* — Edward Look
*Assistant Examiner* — Dwayne J White
(74) *Attorney, Agent, or Firm* — Jones, Walker, Waechter, Poitevent, Carrere & Denegre L.L.P.

(57) ABSTRACT

The specification and drawings describe machines and methods that transform the kinetic energy of moving bodies of fluid into useful work. Specifically, embodiments of the invention may be used to generate electricity. In preferred embodiments a buoyant or semi-buoyant propeller assembly interfaces with a flowing body of water to capture power for electricity generation or any other work project.

20 Claims, 13 Drawing Sheets

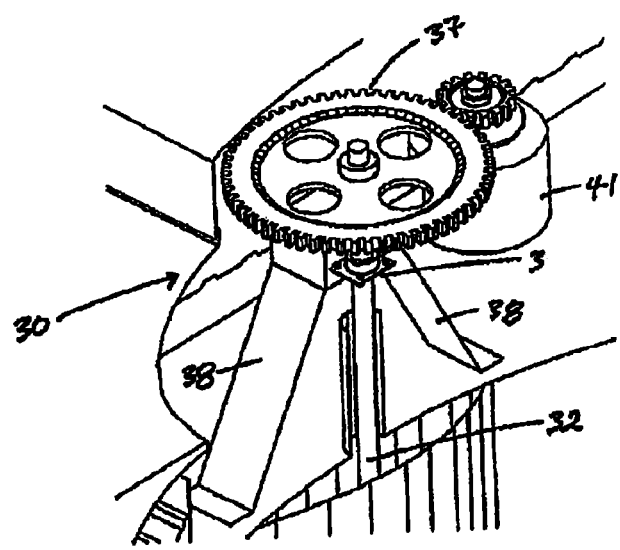
Fig. 9
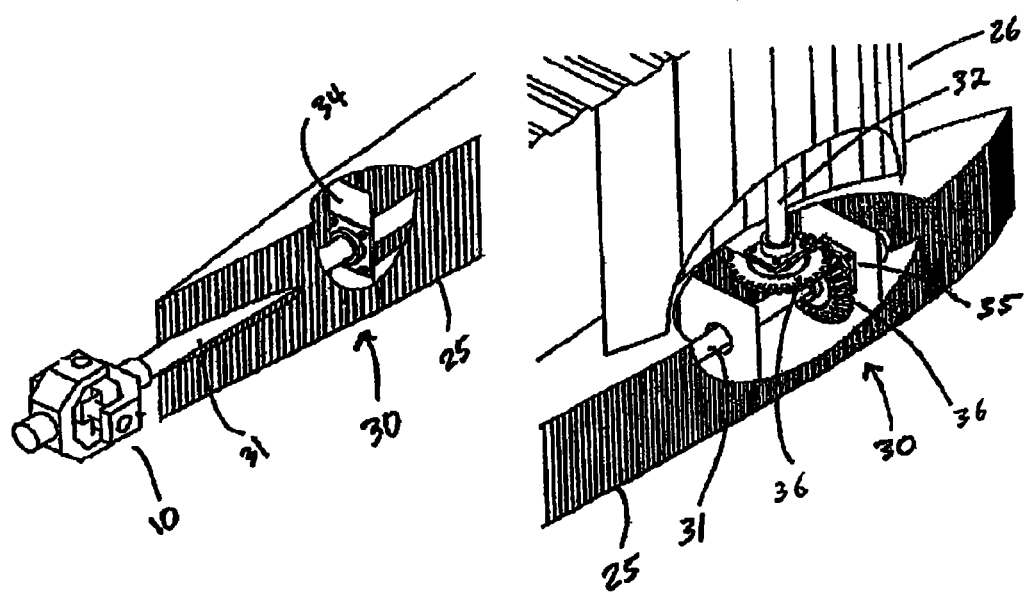
Fig. 11
Fig. 10

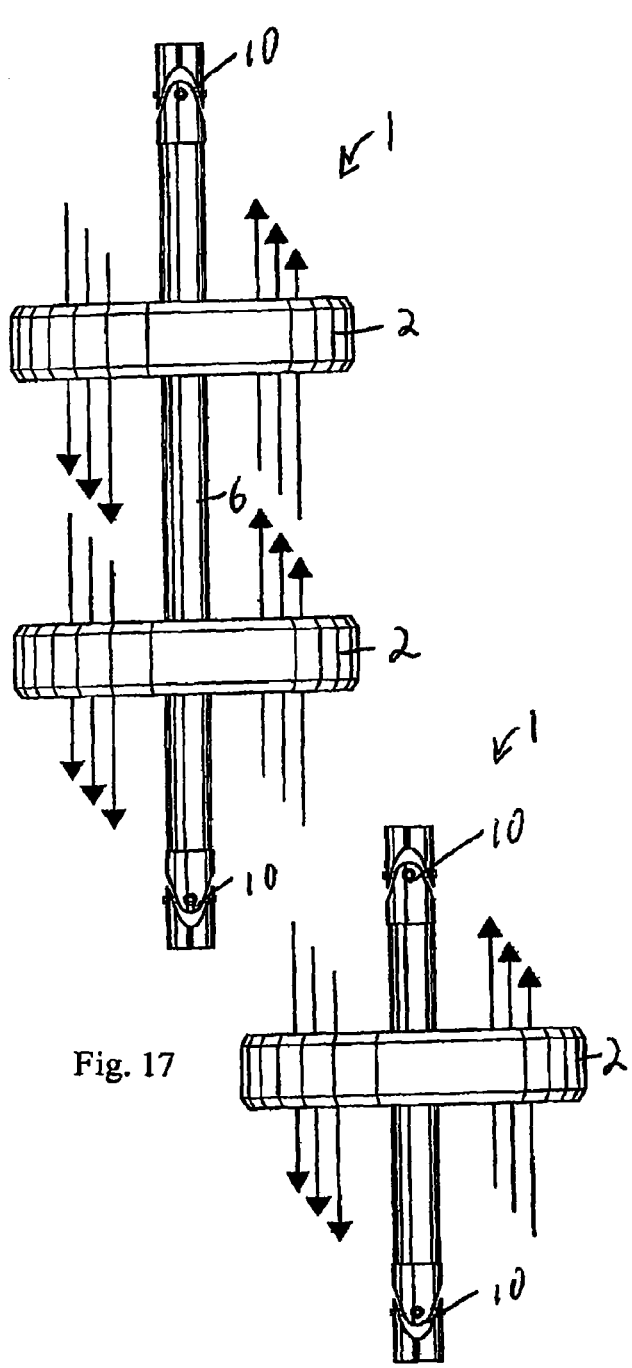
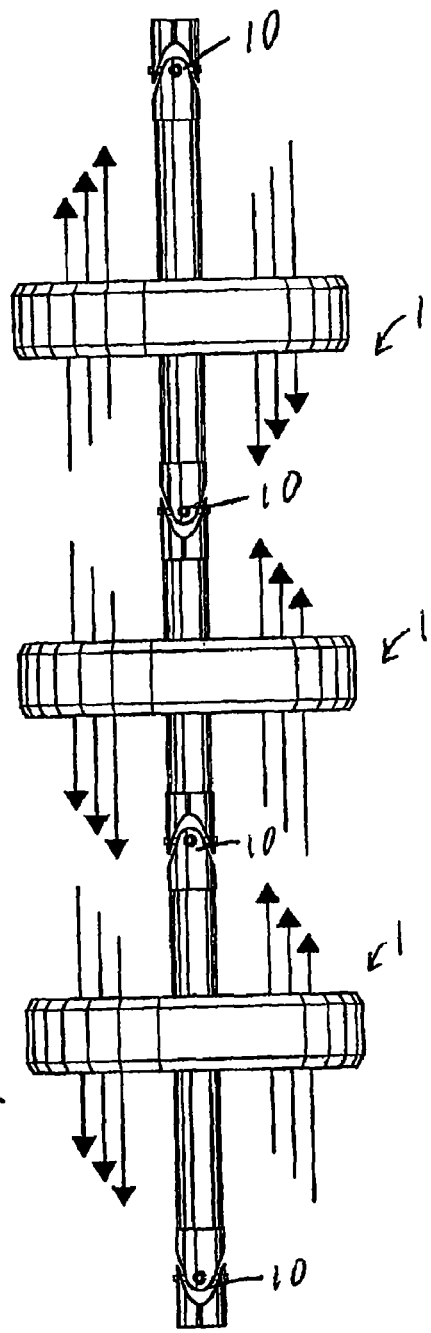
Fig. 17
Fig. 18
Fig. 19

WATER FLOW ENERGY EXTRACTION DEVICE

I. CROSS-REFERENCE TO RELATED APPLICATION

This application is a continuation-in-part of U.S. nonprovisional application Ser. No. 13/051,551 filed on Mar. 18, 2011, which claims priority to U.S. provisional patent application Ser. No. 61/316,201 filed on Mar. 22, 2010 entitled "Water Flow Energy Extraction Device", all of which are incorporated by reference herein in their entirety.

II. STATEMENT REGARDING FEDERALLY SPONSORED RESEARCH OR DEVELOPMENT

Not Applicable.

III. THE NAMES OF THE PARTIES TO A JOINT RESEARCH AGREEMENT

Not Applicable.

IV. INCORPORATION-BY-REFERENCE OF MATERIAL SUBMITTED ON A COMPACT DISC

Not Applicable.

V. FIELD OF INVENTION

The invention relates to machines and methods that transform the kinetic energy of moving bodies of water into useful work. Specifically, embodiments of the invention may be used to generate electricity.

VI. BRIEF DESCRIPTION OF THE DRAWINGS

Figure 1:
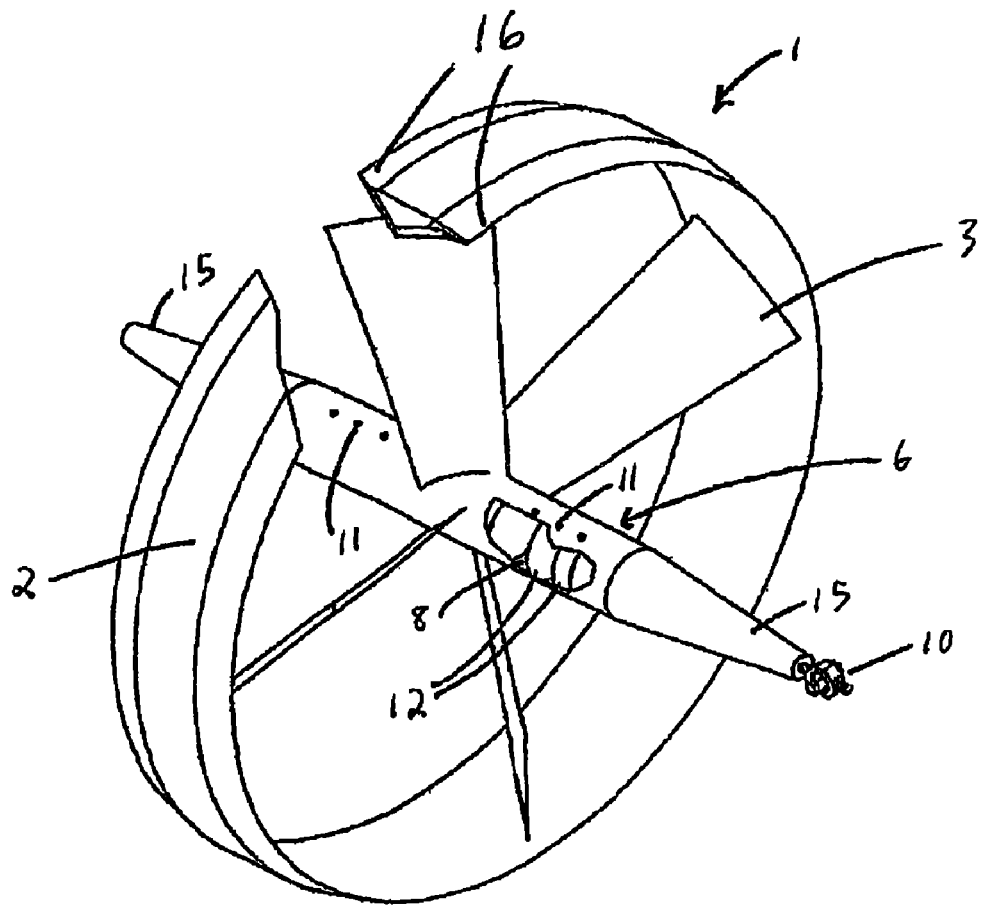
Figure 2:
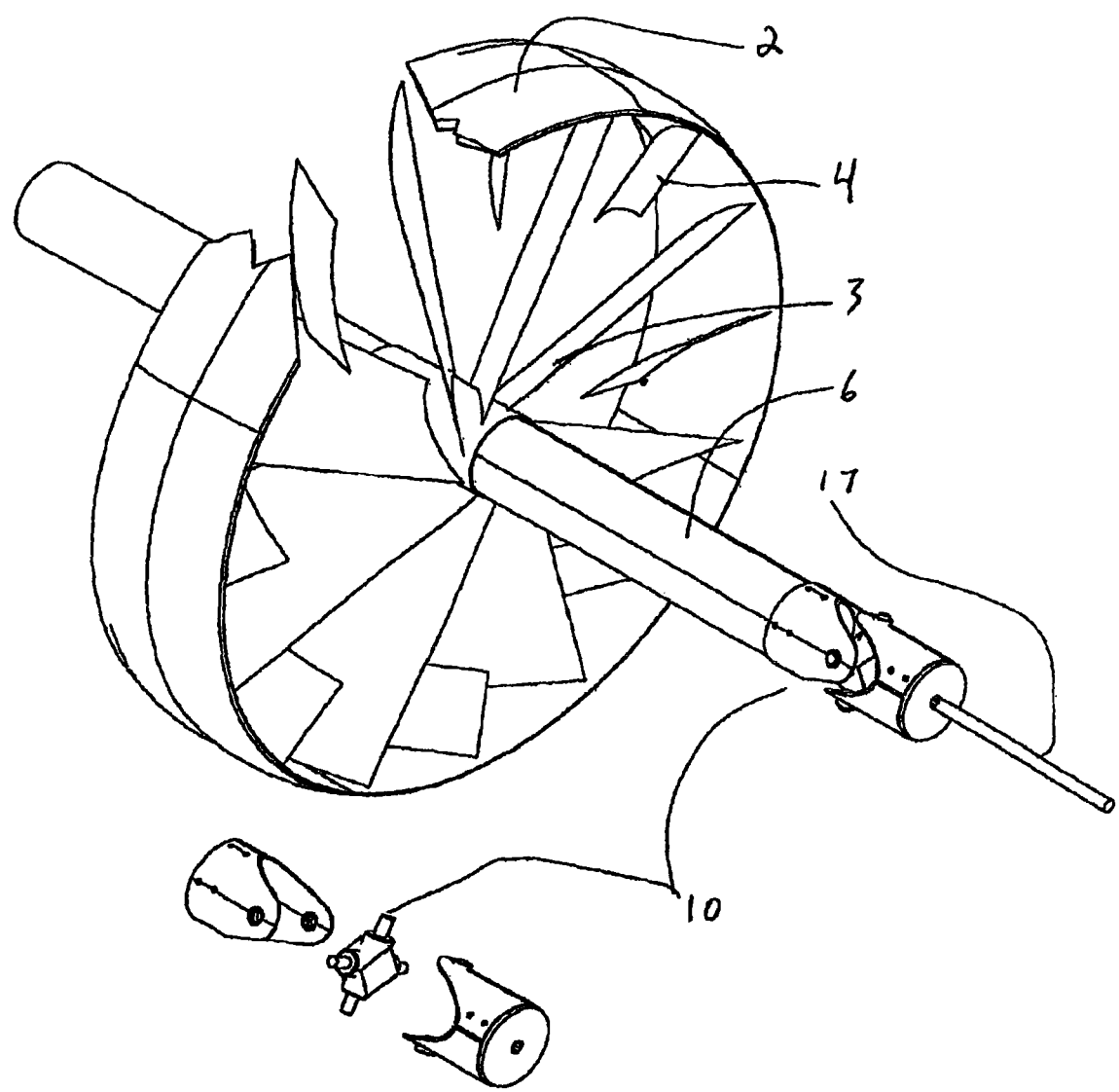
Figure 3:
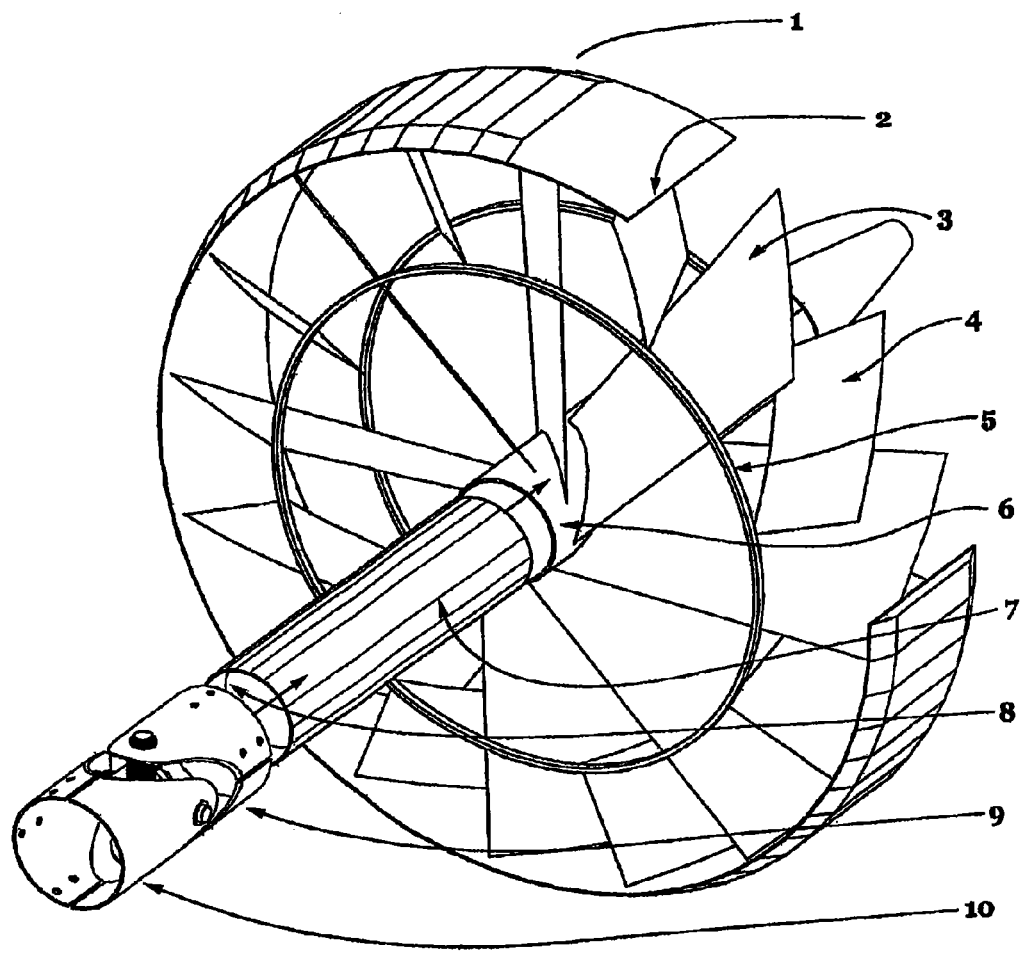
Figure 4:
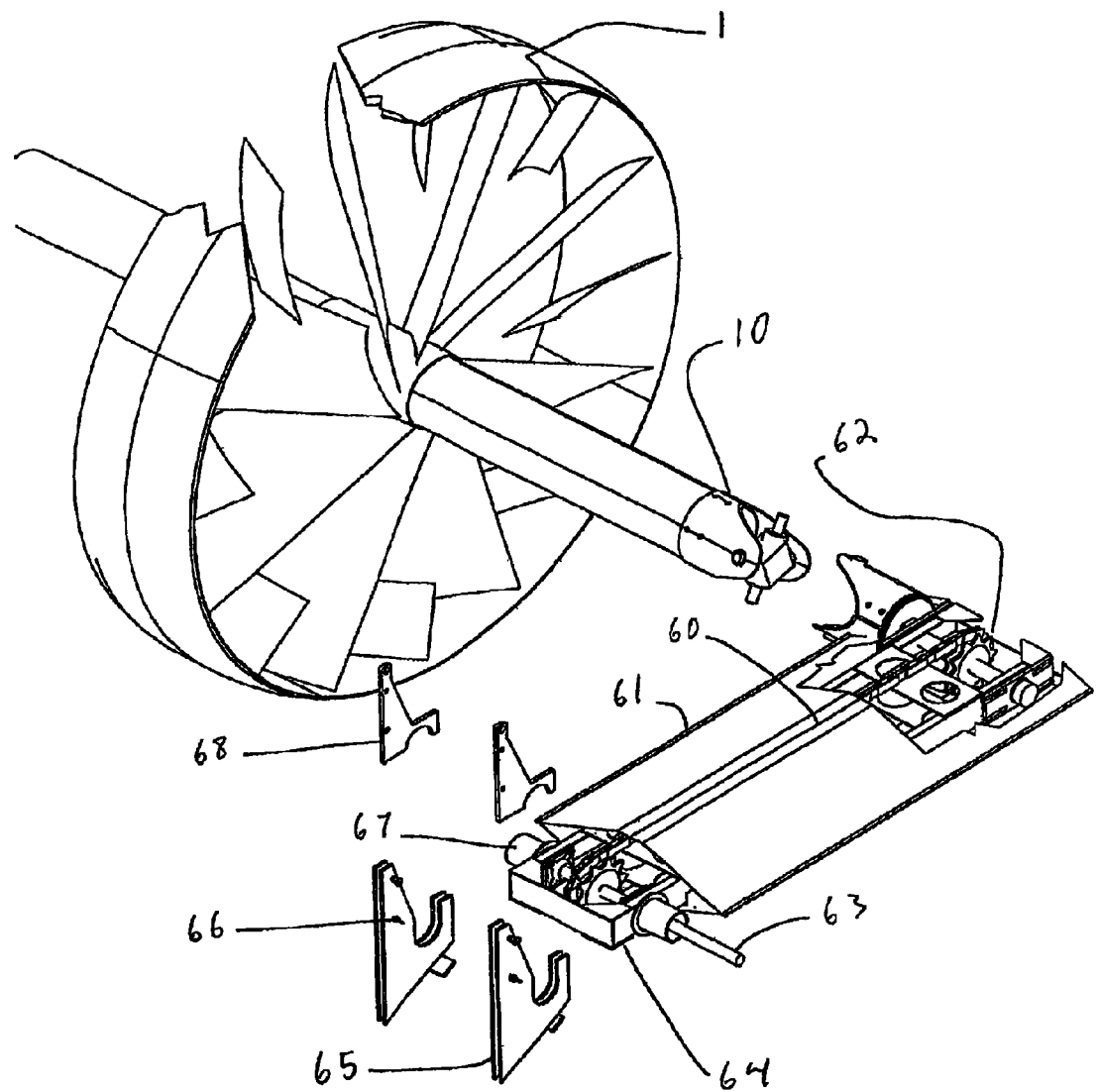
Figure 5:
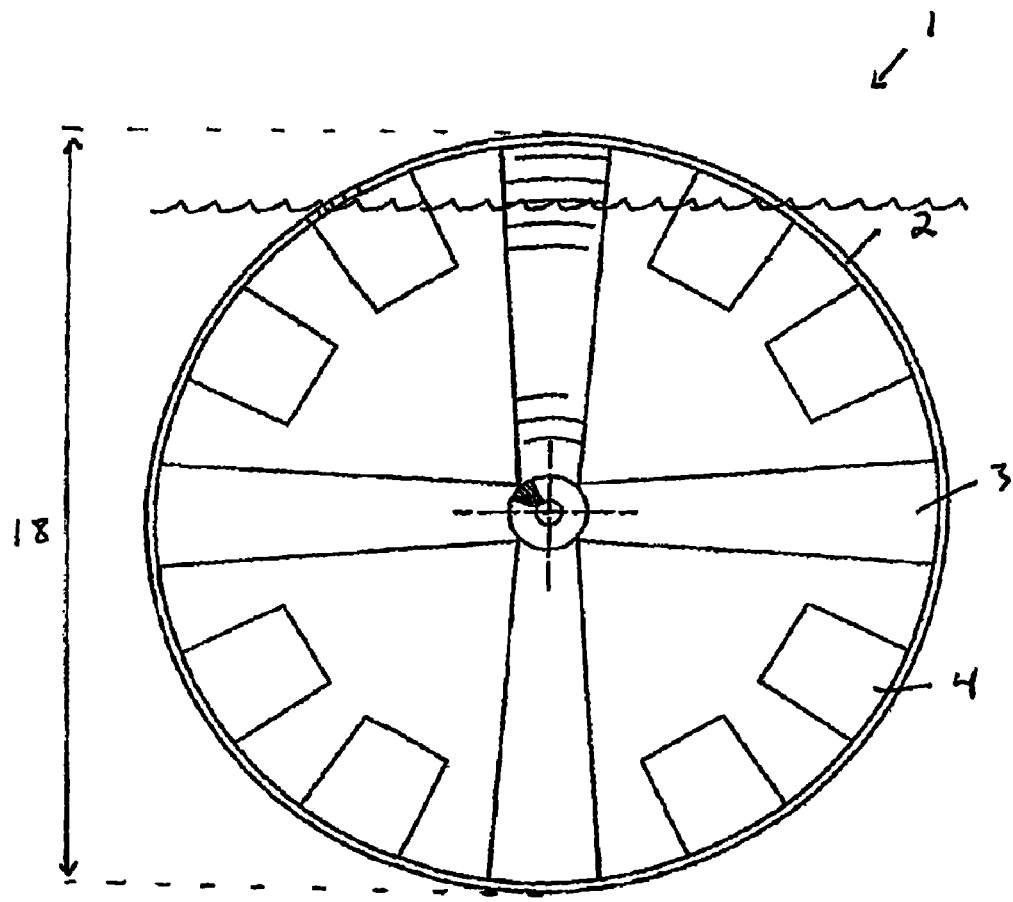
Figure 6:
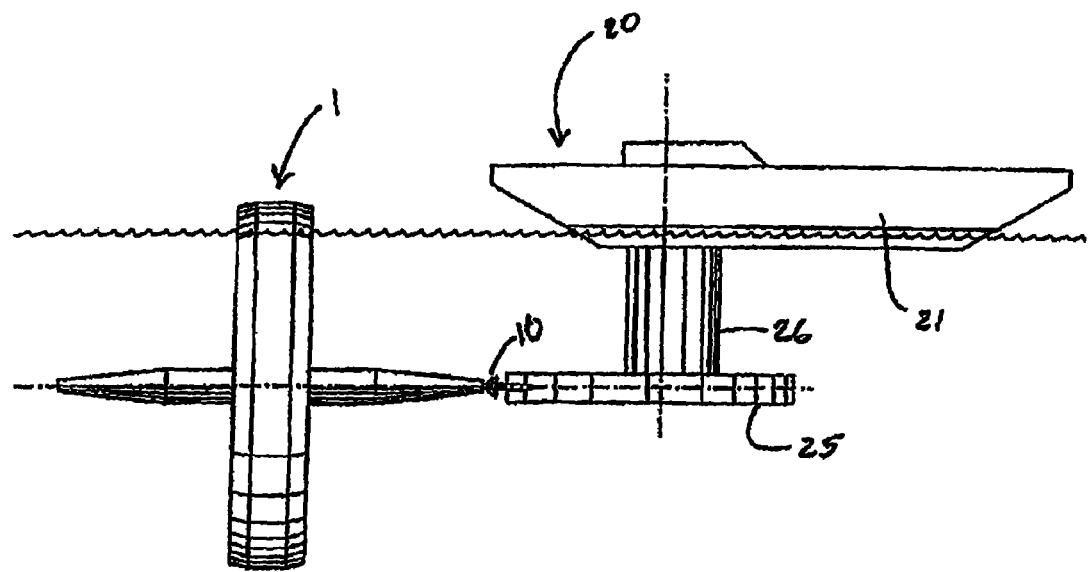
Figure 7:
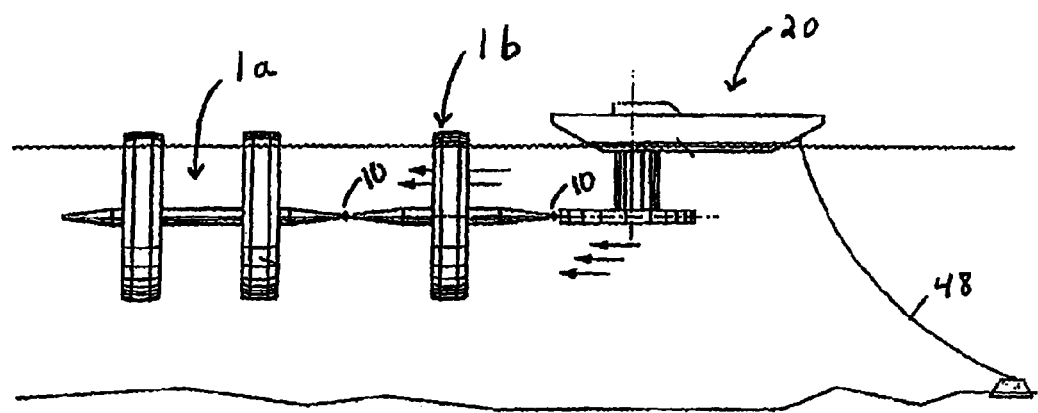
Figure 8:
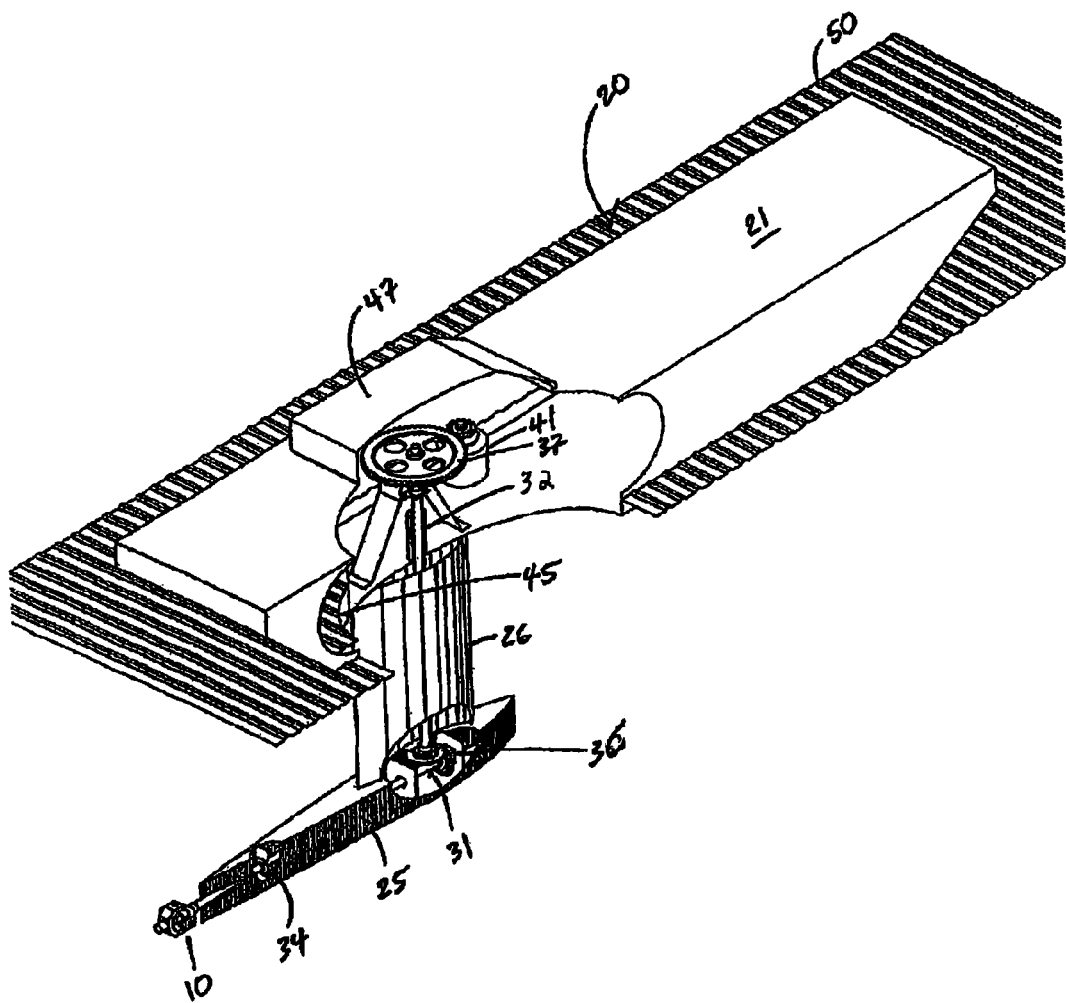
Figure 12:
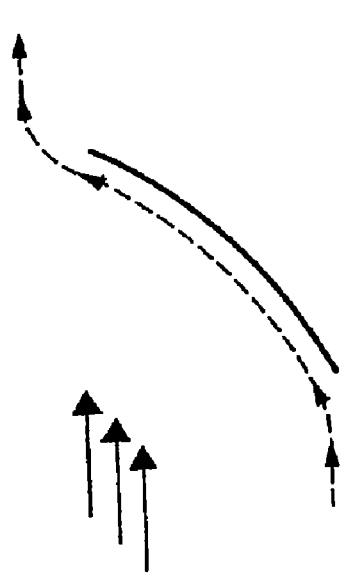
Figure 13:
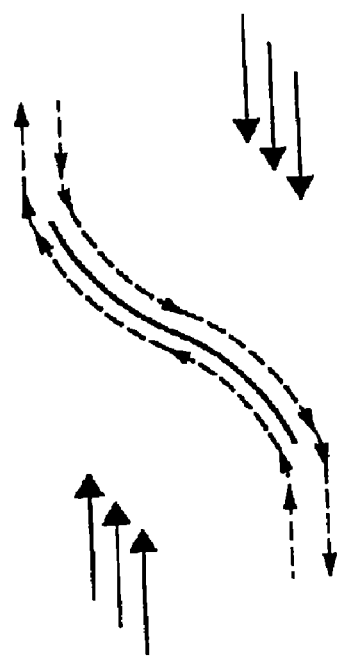
Figure 14:
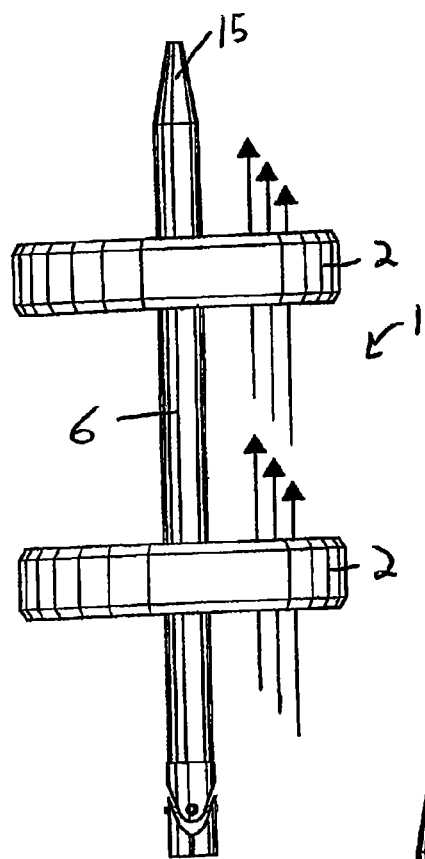
Figure 15:
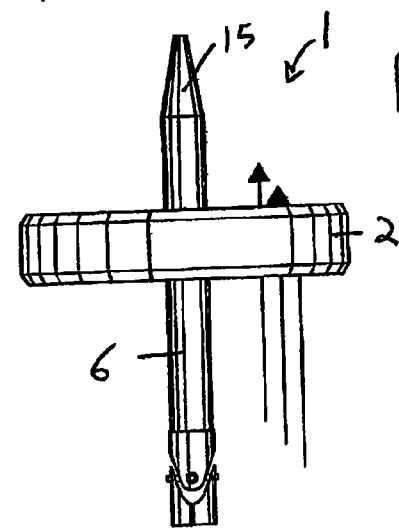
Figure 16:
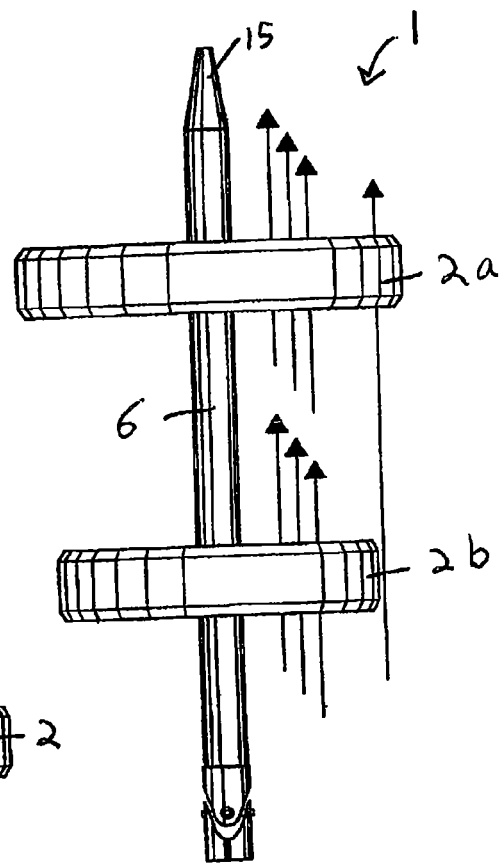
Figure 20:
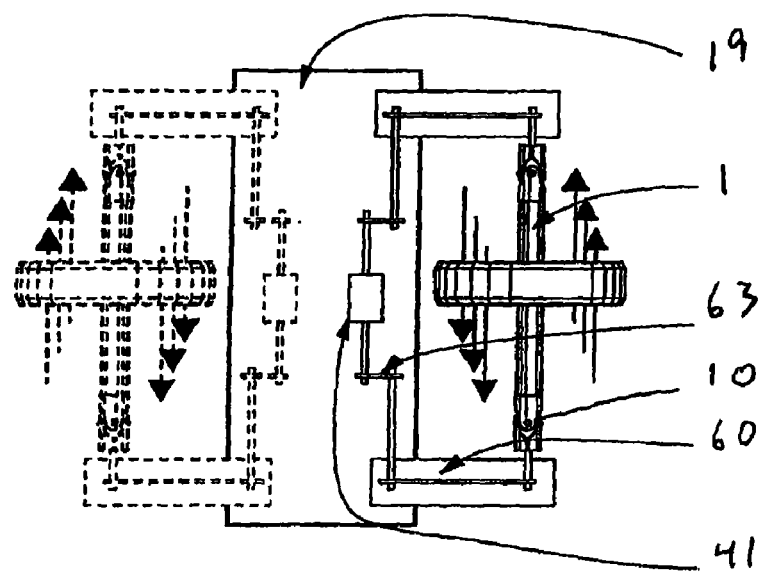
Figure 21:
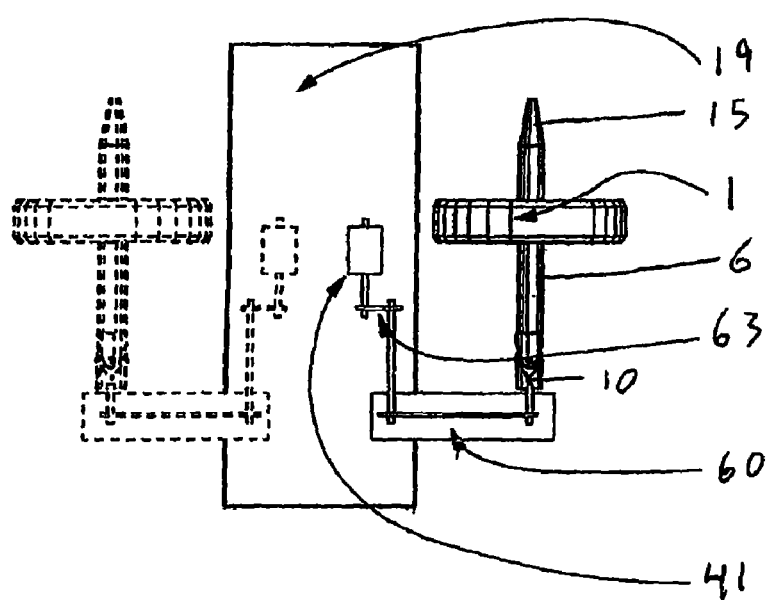

FIG. 1 is an isometric view of an embodiment described herein.
FIG. 2 is an isometric view of an embodiment described herein.
FIG. 3 is an isometric view of an embodiment described herein.
FIG. 4 is an isometric view of an embodiment described herein.
FIG. 5 is a front elevation view of an embodiment described herein.
FIG. 6 is a side elevation view of an embodiment described herein.
FIG. 7 is a side elevation view of an embodiment described herein.
FIG. 8 is an isometric view of an embodiment described herein.
FIG. 9 illustrates details of FIG. 8.
FIG. 10 illustrates details of FIG. 8.
FIG. 11 illustrates details of FIG. 8.
FIG. 12 illustrates a propeller shape for unidirectional flow.
FIG. 13 illustrates a propeller shape for bidirectional flow.
FIG. 14 is a plan (top) view of an embodiment described herein.
FIG. 15 is a plan (top) view of an embodiment described herein.
FIG. 16 is a plan (top) view of an embodiment described herein.
FIG. 17 is a plan (top) view of an embodiment described herein.
FIG. 18 is a plan (top) view of an embodiment described herein.
FIG. 19 is a plan (top) view of an embodiment described herein.
FIG. 20 is a plan (top) view of an embodiment described herein.
FIG. 21 is a plan (top) view of an embodiment described herein.

VII. DETAILED DESCRIPTION

One embodiment of the invention is a propeller assembly for water flow power capture. The propeller assembly generally comprises: (1) a shaft; (2) a plurality of propeller blades extending from said shaft; and (3) a cowling at least partially encircling said propeller blades and being attached to at least two of said propeller blades. The propeller assembly is capable of exhibiting buoyancy when placed in a fluid medium. Materials and composition of the propeller assembly are preferably selected such that no more than 85% of the propeller assembly, measured by the diameter of the cowling, is submerged. However, other embodiments of the invention may function as intended even if the entire propeller assembly is submerged.

Now turning to FIG. 1, one embodiment of a propeller assembly 1 is shown. A plurality of propeller blades 3 are attached to a propeller shaft 6. The propeller shaft 6 has tapered leading and trailing ends 15. One end of the propeller shaft 6 is attached to a universal joint 10. The propeller shaft 6 has an interior 8, which may house ballast compartments 12. Closable fill passages 11 allow for operable regulation of buoyancy of the propeller assembly 1 by regulating the contents of the ballast compartments 12. FIG. 1 illustrates three separate ballast compartments 12 both fore and aft of propeller blades 3. The cowling 2 is attached to the propeller blades 3 and has taper leading and trailing edges 16. The cowling may likewise be hollow to achieve designed control buoyancy. Ballast space or compartments could be positions in the cowling 2, propellers 3, or elsewhere on the propeller assembly. Likewise, other embodiments may not have tapered shaft ends 15 and may not have the cowling 2.

Buoyancy could also be accomplished without ballast compartments, but simply with a proper choice of buoyant and non-buoyant materials or by any other means. For example, the propeller assembly could be constructed with metals, polymers, fiberglass, carbon-reinforce composites, foam, or wood. Buoyancy may be established with metals or concrete or other denser than water substances.

Turning to FIG. 2, a cowling 2 is shown with supplemental propellers 4 and propeller blades 3 attached thereon. Supplemental propellers 4 do not extend from the cowling 2 to the propeller shaft 6 as propeller blades 3 do. The propeller shaft 6 is attached to a power shaft 17 by a universal joints 10.

Turning to FIG. 3, a propeller assembly 1 is shown. The cowling 2 is attached to propeller blades 3 and supplemental propellers 4, which are attached to support ring 5. The propeller blades 3 are also attached to the propeller shaft 6. The propeller shaft 6 has an exterior 7 and an interior 8. In this embodiment, the propeller shaft 6 is attached to universal joint 10 by the universal joint housing engaging the shaft 6.

Turning to FIG. 4, a propeller assembly 1 is shown interfacing with a power transfer assembly 60 via a universal joint 10. The propeller assembly 1 drives a chain and sprocket power transfer 62 that in turn drives a power transfer axle 63. The power transfer assembly 60 is protected and supported by a power transfer arm housing 61. In alternate embodiments, a hydraulic power transfer mechanism may be effectively employed. In this embodiment, the structural frame 64 of the power transfer arm assembly 60 may be attached to a fixed or mobile structure, such as a riparian dock or vessel, by placing the arm up-down rotation axis 67 into mounting seats 65, which are in turn locked in place by seat locks 68 and lock pins 66.

Turning to FIG. 5, a propeller assembly 1 is shown in front elevation view comprising propeller blades 3 and supplemental propellers 4 attached to a cowling 2 that has a diameter 18. In preferred embodiments, the buoyancy of the propeller assembly 1 is selected such that no more than about 85% of the cowling diameter 18 is submerged. However, the percentage of the cowling diameter submerged could vary greatly in other embodiments (e.g., no more than about 50%, 60%, 80%, or 90% of the cowling diameter is submerged). Of course, in certain embodiments, the entire cowling could be submerged.

Now turning to FIG. 6, an alternate embodiment of the invention, a vessel 20, is shown. A vessel 20 may be any support base that allows a moving body of fluid to flow past it. Preferably, a vessel 20 is a marine vessel having a vessel hull 21. A vertical shaft housing 26 attaches the vessel hull 21 to a horizontal shaft housing 25. The horizontal shaft housing 25 is attached to a universal joint 10, which is in turn attached to a propeller assembly 1. As shown in FIG. 7, the vessel 20 may be immobilized by a anchor line 48. Multiple propeller assemblies 1a and 1b may be attached to the vessel 20 by successive universal joints 10. Propeller assembly 1a comprises two sets of propeller blades and two cowlings attached to a common shaft.

Turning to FIG. 8, an isometric view of a vessel 20 floating in water 50 is shown. A vertical shaft housing 26 is attached to both a vessel hull 21 and a horizontal shaft housing 25. A universal joint 10 receives motive power from a propeller assembly (not shown) and drives a horizontal shaft element 31. The horizontal shaft element 31 may be supported by one or more shaft bearings 34. Bevel gears 36 transfer power from the horizontal shaft element 31 to a vertical shaft element 32, which in turn drives a speed setting gear 37. A generator 41 generates electricity from the power transferred to it from the speed setting gear 37. An equipment access cover 47 allows for ease of access to the components attached to the vessel hull 21.

Turning to FIG. 9, portions of the power train assembly 30 are shown. The vertical shaft element 32 transfers power to the speed setting gear 37, which in turn drives the generator 41. In this embodiment, the generator 41 is attached to the power train assembly 30 by interfacing with the speed setting gear 37. Shaft struts 38 and a shaft bearing 34 provide support to the speed setting gear 37 and the vertical shaft element 32. FIG. 10 shows portions of the power train assembly 30. The horizontal shaft housing 35 is attached to the vertical shaft housing 26. The horizontal shaft element 31 drives the vertical shaft element 32 by bevel gears 36. Thrust bearing 35 supports the horizontal shaft element 31 and the bevel gear 36 to which it is attached. FIG. 11 shows portions of the power train assembly 30. Universal joint 10 drives the horizontal shaft element 31, which is at least partially enclosed within the horizontal shaft housing 25. Shaft bearing 34 provides support to the horizontal shaft element 31.

Now turning to FIGS. 12 and 13, two different propeller blade shapes or supplemental propeller shapes are shown. The propeller shape of FIG. 12 is optimized for unidirectional flow while the propeller shape of FIG. 13 is optimized for bidirectional flow. For example, FIGS. 14-16 show propeller assemblies that are optimized for unidirectional flow, while FIGS. 17-19 shown propeller assemblies that are optimized for bidirectional flow. The propeller shape of FIG. 12 would be used for the former group while the propeller shape of FIG. 13 would be used for the latter group.

Turning to FIG. 14, a propeller assembly 1 is shown comprising two sets of propeller blades (not shown) and two cowlings 2 attached on a common propeller shaft 6, which has a tapered end 15. Other embodiments of the invention may have more than two sets of propeller blades and cowlings attached on a common propeller shaft. FIG. 15 shows a propeller assembly 1 with only one cowling 2. FIG. 16 shows a propeller assembly 1 comprising two sets of propeller blades (not shown) and two cowlings 2a and 2b attached on a common propeller shaft 6. A first cowling 2b is upstream from a second cowling 2a. The second cowling 2a has a greater diameter than the first cowling 2b, which allows the second cowling 2a to not be completely in the hydraulic "shadow" of the first set of propeller blades.

Turning to FIG. 17, a propeller assembly 1 is shown comprising two sets of propeller blades (not shown) and two cowlings 2 attached on a common propeller shaft 6. Both ends of the propeller shaft 6 are attached to universal joints 10 (particularly for bi-directional flow situations). In alternative embodiments, joints other than universal joints may be used. A universal joint 10 may be connected to another propeller assembly, as shown in FIG. 19. Alternatively, as shown in FIG. 4, a universal joint 10 may be attached to a power transfer arm assembly 60 or any other means of transferring energy to a generator. FIG. 18 shows a propeller assembly 1 with only one cowling 2.

Turning to FIG. 20, a propeller assembly 1 is attached to a power transfer arm assembly 60 by a universal joint 10. The power transfer arm 60 is part of a power train assembly (i.e., such as described in FIG. 4). The power transfer arm 60 transfers power to a generator 41 by a power transfer axle 63. Alternative embodiments may transfer power from the propeller assembly to the generator by hydraulic or other means. The generator 41 is positioned on a propeller support base 19. A propeller support base 19 is preferably a vessel, but could also be a stationary platform fixed relative to the river/ocean bottom by pilings or other means. The embodiment of the invention shown in FIG. 20 is optimized for bidirectional flow, such as in bodies of water subject to tidal flows or wave action.

Turning to FIG. 21, a propeller assembly 1 is attached to a power transfer arm assembly 60 by a universal joint 10. The propeller shaft 6 has a tapered trailing end 15. The generator 41 is positioned on a propeller support base 19 and is attached to a power train assembly in a manner to receive mechanical power from the propeller assembly 1.

Alternative embodiments include the following examples.

A water powered generating apparatus comprising: a buoyant propeller assembly including a propeller shaft and a plurality of propeller blades extending therefrom; a power train attached to said propeller assembly; a propeller support base attached to said power train; and a generator attached to said power train assembly in a manner to receive mechanical power from said power train assembly. A variation of this embodiment further comprises said power train comprising a power shaft and at least one universal joint. Said universal joint is preferably attached to said propeller shaft and said power shaft preferably further comprises a first shaft element extending from said universal joint and attaching to a second shaft element, said second shaft element extending in a non-parallel direction relative to said first shaft element and transmitting power to said generator. Said second shaft is preferably oriented approximately perpendicular to said first shaft wherein a bevel gear transfers power between said first and second shaft elements. Said propeller support base is preferably a marine vessel. Such an embodiment may further comprise a first and second propeller assemblies positioned in line.

Another embodiment is propeller assembly comprising (a) a shaft; (b) a plurality of propeller blades extending from the shaft; and (c) wherein the propeller assembly is capable of exhibiting buoyancy when placed in water. This embodiment could be further modified by including a cowling at least partially encircling the propeller blades and being attached to at least two of the propeller blades.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

What is claimed is:

1. A propeller assembly for a water powered generation apparatus, said assembly comprising:
    a shaft;
    a plurality of propeller blades extending from said shaft, the propeller blades having a first end and a second end, wherein the first end is more proximate to the shaft than the second end; and
    a cowling encircling said propeller blades, the cowling being rigidly attached to the second ends of at least two of said propeller blades;
    wherein said propeller assembly is capable of exhibiting sufficient buoyancy when placed in water such that between about 75% and about 95% of a diameter of the cowling is submerged.

2. The propeller assembly of claim 1, further comprising at least one ballast compartment positioned within an interior of said shaft and a closable fill passage allowing fluid communication between said ballast compartment and an exterior of said shaft.

3. The propeller assembly of claim 1, wherein said shaft is at least partially composed of or filled with foam.

4. The propeller assembly of claim 1, wherein said cowling has tapered front and rear edges.

5. The propeller assembly of claim 1, further comprising supplemental propellers having a length, said length being less than a distance between said cowling and said shaft wherein said supplemental propellers are attached to said cowling.

6. The propeller assembly of claim 1, further comprising two or more sets of propeller blades and two cowlings attached on a common propeller shaft.

7. The propeller assembly of claim 6, further comprising a first cowling having a first diameter and a second cowling having a second diameter wherein said first diameter is less than said second diameter.

8. The propeller assembly of claim 1, wherein said cowling and said shaft are constructed of different materials.

9. A floating vessel for generating power, said vessel comprising:
    a vessel hull;
    a power train assembly positioned at least partially on said vessel hull;
    a buoyant propeller assembly attached to said power train assembly, said propeller assembly including a propeller shaft and a plurality of propeller blades extending therefrom; wherein said propeller assembly is capable of exhibiting sufficient buoyancy when placed in water such that between about 75% and about 95% of a diameter of the cowling is submerged; and
    a generator positioned on said floating vessel and attached to said power train assembly in a manner to receive mechanical power from said power train assembly.

10. The floating vessel of claim 9, further comprising a vertical shaft housing that extends downward from said vessel hull and is attached to a horizontal shaft housing.

11. The floating vessel of claim 10, wherein said vertical shaft housing comprises an elongated elliptical shape oriented parallel to a length of said vessel and said horizontal shaft housing comprises an elongated double arc shape parallel to a length of said vessel.

12. The floating vessel of claim 11, wherein said power train assembly includes a first shaft element extending through said vertical shaft housing and a second shaft element extending through said horizontal shaft housing, wherein a bevel gear transfers torque from said first shaft element to said second shaft element.

13. The floating vessel according to claim 12, wherein said first shaft elements is attached to a speed adjusting gear system which engages said generator.

14. The floating vessel according to claim 9, further comprising an anchor line attached to said vessel hull to a fixed object in a body of water.

15. A method of generating electricity comprising:
    providing a floating vessel for generating power, said vessel comprising:
        a vessel hull;
        a power train assembly positioned at least partially on said vessel hull;
        a buoyant propeller assembly attached to said power train, said propeller assembly including a propeller shaft and a plurality of propeller blades extending therefrom; wherein said propeller assembly is capable of exhibiting sufficient buoyancy when placed in water such that between about 75% and about 95% of a diameter of the cowling is submerged; and
        a generator positioned on said floating vessel and attached to said power train assembly in a manner to receive mechanical power from said power train assembly;
    fixing said floating vessel in a moving body of water.

16. The floating vessel according to claim 9, wherein the propeller blades have a first end and a second end, wherein the first end is more proximate to the propeller shaft than the second end; and
    a cowling encircling said propeller blades, the cowling being rigidly attached to the second ends of at least two of said propeller blades.

17. A floating vessel for generating power, said vessel comprising:
    a vessel hull;
    a vertical shaft housing that extends downward from said vessel hull and is attached to a horizontal shaft housing;
    a power train assembly positioned at least partially on said vessel hull;
    a buoyant propeller assembly attached to said power train assembly, said propeller assembly including a propeller shaft and a plurality of propeller blades extending therefrom; and
    a generator positioned on said floating vessel and attached to said power train assembly in a manner to receive mechanical power from said power train assembly.

18. The floating vessel of claim 17, wherein said vertical shaft housing comprises an elongated elliptical shape oriented parallel to a length of said vessel and said horizontal shaft housing comprises an elongated double arc shape parallel to a length of said vessel.

19. The floating vessel of claim 18, wherein said power train assembly includes a first shaft element extending through said vertical shaft housing and a second shaft element extending through said horizontal shaft housing, wherein a bevel gear transfers torque from said first shaft element to said second shaft element.

20. The floating vessel according to claim 19, wherein said first shaft elements is attached to a speed adjusting gear system which engages said generator.

\* \* \* \* \*